United States Patent [19]

Ackermann et al.

[11] Patent Number: 5,642,915

[45] Date of Patent: Jul. 1, 1997

[54] ROOF HATCH FOR LARGE-CAPACITY VEHICLES SUCH AS MOTOR BUSES

[75] Inventors: Werner Ackermann; Hans-Herward Römer, both of Wuppertal, Germany

[73] Assignee: Gebr. Happich GmbH, Wuppertal, Germany

[21] Appl. No.: 534,509

[22] Filed: Sep. 27, 1995

[30] Foreign Application Priority Data

Oct. 25, 1994 [DE] Germany ........................ 44 37 983.8
Dec. 10, 1994 [DE] Germany ........................ 44 44 038.3

[51] Int. Cl.⁶ ...................................................... B60J 7/00
[52] U.S. Cl. ........................... 296/214; 296/216; 49/141; 105/348
[58] Field of Search ............................ 296/214, 216, 296/218, 224; 105/348; 280/748, 751; 454/129, 136; 49/141, 193; 292/DIG. 65

[56] References Cited

U.S. PATENT DOCUMENTS

| 3,694,003 | 9/1972 | Radke .................................. 49/141 X |
| 4,130,966 | 12/1978 | Kujawa, Jr. et al. ..................... 49/141 |
| 4,495,731 | 1/1985 | Sears .................................. 296/218 X |
| 4,702,517 | 10/1987 | Maeda et al. .......................... 296/216 X |
| 5,303,970 | 4/1994 | Young et al. .......................... 296/216 X |
| 5,344,361 | 9/1994 | Mattias ............................... 296/216 X |

FOREIGN PATENT DOCUMENTS

| 0347958 | 9/1989 | European Pat. Off. . |
| 2491841 | 4/1982 | France ................................ 296/214 |
| 4011902 | 5/1991 | Germany ............................... 296/218 |
| 4011903 | 8/1991 | Germany ............................... 296/218 |
| 3835018 | 8/1991 | Germany ............................... 296/218 |
| 4200261 | 7/1993 | Germany . |
| 4333514 | 10/1994 | Germany . |
| 4315461 | 11/1994 | Germany . |
| 2264324 | 8/1993 | United Kingdom ...................... 49/141 |

OTHER PUBLICATIONS

Motor Vehicle Monthly, Mar. 1924, p. 73 "A New System of Bus Ventilation".

*Primary Examiner*—Dennis H. Pedder
*Attorney, Agent, or Firm*—Brinks Hofer Gilson & Lione

[57] ABSTRACT

A roof hatch for the roof of a vehicle, such as a large capacity vehicle. The roof hatch includes a rectangular shaped outer hatch frame, a rectangular shaped inner hatch frame received at the outer hatch frame, a rectangular hatch cover of glass over the open area defined by the hatch frames, a sealing frame between the outer hatch frame and the hatch cover. The hatch cover is mounted on the outer hatch frame by one of adapter angles, or manually adjustable or electromotively adjustable adjusters, with the adjustable adjusters allowing the hatch cover to be opened with reference to the outer frame. The choice of the ways for attaching the hatch cover to the outer hatch frame enable the roof hatch of the invention to be supplied in modules with the user selecting a particular version. In addition, where the hatch cover is openable with reference to the outer frame, a lock can prevent such opening, handles on the lock can open the lock. To prevent that opening, a movable blocking element can be operable to block movement of the handles for opening the lock.

5 Claims, 13 Drawing Sheets

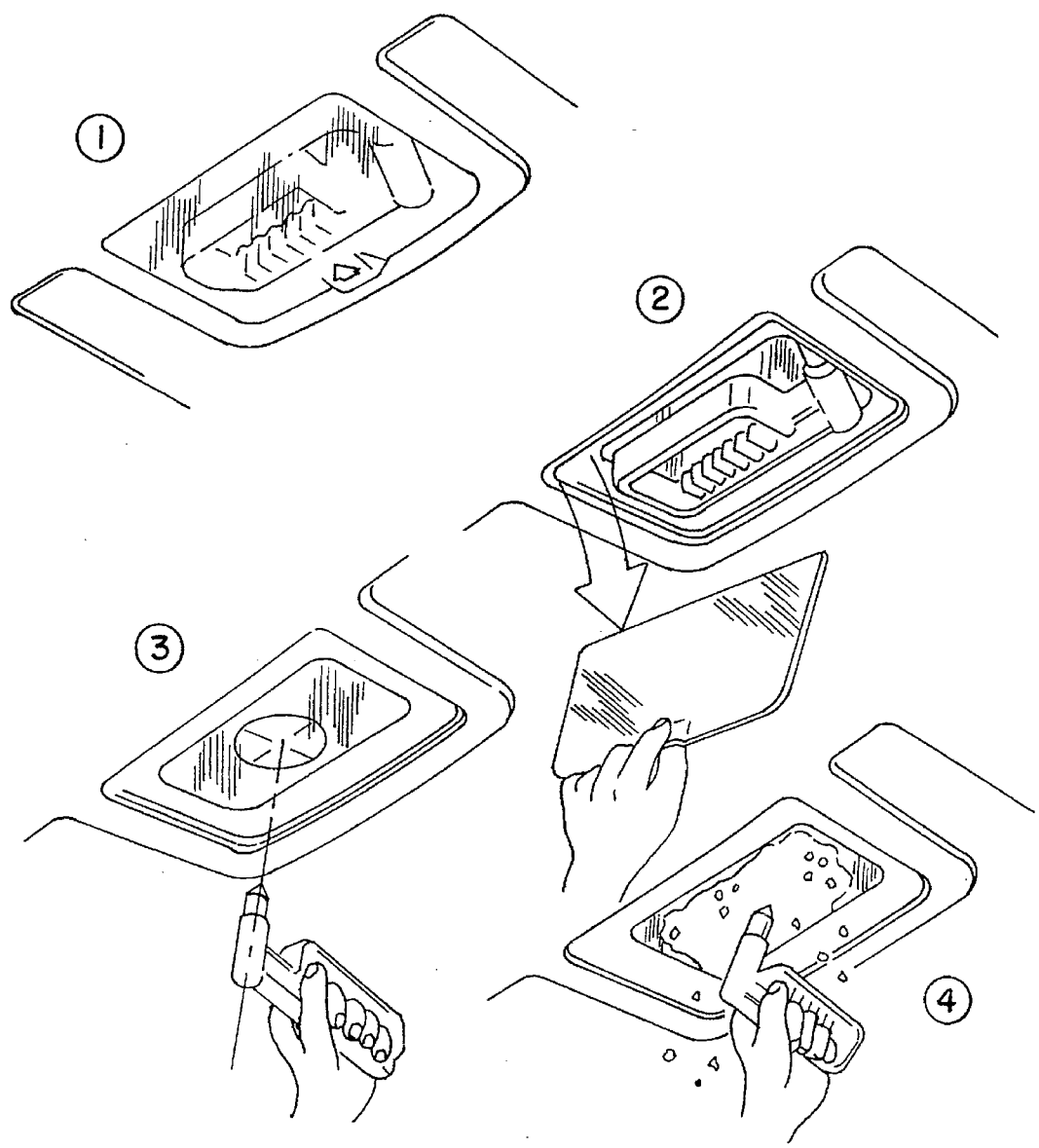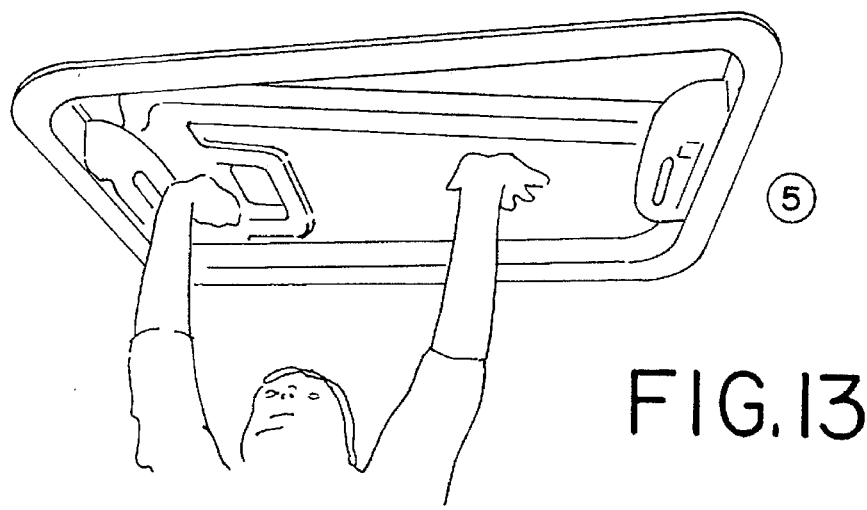
FIG. 13

ROOF HATCH FOR LARGE-CAPACITY VEHICLES SUCH AS MOTOR BUSES

BACKGROUND OF THE INVENTION

The invention relates to a roof hatch for large capacity vehicles such as motor buses. The hatch includes an inner rectangular hatch frame, an outer rectangular hatch frame, a rectangular hatch cover, a sealing frame between the outer hatch frame and the hatch cover and means for mounting the hatch cover on the outer hatch frame.

Roof hatches of this kind have become known in various embodiments. They are used in the simplest embodiments for improved lighting of the vehicle, in an improved embodiment for the ventilation of the vehicle (DE-A-21 58 430) and in a further embodiment also as an emergency exit (DE-A-1 630 020). Each of the common roof hatches forms a modular construction unit that does not allow any modifications.

SUMMARY OF THE INVENTION

An object of the present invention is to provide a roof hatch which is expandable according to a modular system.

Another object is to provide expandability by consistent use of the same constructively similar basic elements, namely an inner and an outer hatch frame and a hatch cover, and in addition these components can be arranged in such a way that the hatch can be used both for ventilating the vehicle and as emergency exit.

A further object is to provide a roof hatch with a relatively simple and inexpensive arrangement, an appealing design and high functional security.

The invention provides means for mounting the hatch cover on the outer hatch frame. Those means optionally are comprised of two adapter angles which are each attached to the narrow sides of the hatch cover and the outer hatch frame, or manually actuatable adapters or electromotively actuatable adapters. In a simple first embodiment the roof hatch provides only an opening for light through the roof of the vehicle. A second embodiment allows manual opening of the roof hatch into a ventilating position. A third embodiment allows electromotive opening and closing movement of the hatch cover. In all three embodiments, the same constructively similar modular elements and a roof hatch comprised of a glass pane are used. The glass pane offers not only the ability to transmit light, but also the advantage of destructibility in order to offer an escape route from the vehicle in an emergency. For the latter reason the inner hatch frame carries a mounting element with an emergency hammer arranged on it for smashing the glass pane forming the hatch cover.

The roof hatch in accordance with the invention is further expandable by using the constructively similar basic elements. On request, an unlocking mechanism may be arranged at the adapter angle, the manually actuatable adjuster or the electromotively actuatable adjuster, each of which connects the hatch cover with the outer hatch frame, in order for the unlocking mechanism to be operated to detach all connections between the hatch cover and the outer hatch frame in an emergency and to be able to eject the hatch cover from the outer hatch frame. Here an emergency escape route is created, not by destroying the hatch cover, but by releasing it from its mountings. Of course, the hatch cover in this embodiment can also comprise a glass plate. But it is also possible to replace the hatch cover by a sheet metal plate on request.

In a further embodiment of the invention, the unlocking mechanism is provided with a first actuating handle accessible from inside the vehicle and a second actuating handle accessible from outside the vehicle. To provide reliable protection from entry into the vehicle through the hatch and to prevent theft, the outwardly accessible actuating handle of the unlocking mechanism can be blocked from operating from inside the vehicle by a manually, electromotively or electromagnetically actuatable blocking device. In a particularly effective and easy to operate method, the actuating handle of the unlocking mechanism, which is accessible from the outside, can be blocked by a blocking device which is coupled with the central locking mechanism of the vehicle.

For the more sophisticated embodiment of the roof hatch of the invention, two longitudinal beams are attached to the hatch cover. In addition to supporting the unlocking mechanism and the blocking device, they carry a decorative element which lines the hatch cover on the inside of the vehicle. The longitudinal beams provide additional twist resisting rigidity for the hatch cover and in a simple way allow the attachment of components such as an unlocking mechanism, a blocking device and a decorative element which can be adapted to the decoration in the interior of the vehicle.

A further arrangement of the invention which is of particular advantage equips the roof hatch with a lighting device. Such a lighting device can be used either as emergency lighting or also as marking for the escape route and optionally may be provided with illuminated letters indicating the exit, for example.

A further feature of the invention comprises providing the roof hatch with an electromotively driven ventilator.

In another embodiment of the invention, the hatch cover is comprised of a safety glass pane, and an inner cover is provided below the hatch cover. The inner cover is clamped between the hatch cover and the two adjusters. The inner cover is provided with a window-like opening making the hatch cover accessible for being broken by an emergency hammer.

This embodiment of the invention offers particular advantages. The roof hatch can be opened for ventilating purposes by means of the provided adjusters and can be closed again if desired. In particular, however, the roof hatch in accordance with the invention can also fulfill its desired function as an emergency exit. Arranging the hatch cover as a safety glass pane (tempered safety glass) is used for this purpose. The safety glass pane means a pane which shatters completely or breaks into glass particles under hard impact. For this purpose an impact with an emergency hammer provided with a solid tip is usually sufficient. The inner cover arranged below the security glass pane is used at first to prevent the frequently undesirable incidence of light into the interior of the vehicle. In addition, the inner cover is to be used to catch glass particles in the event of any required destruction of the security glass pane. In order to enable the hatch cover formed by the security glass pane to be shattered by means of an emergency hammer from the interior of the vehicle, the inner cover is provided with a window-like opening. The inner cover is held by mere clamping between the hatch cover and the adjusters. This mounting means is instantly lost when the hatch cover is destroyed. Now bare of any mounting means it is possible to eject the inner cover together with the collected glass particles and to open the emergency exit. The inner cover is prevented from falling down into the interior of the vehicle by its resting on the adjusters.

Using the roof hatch in accordance with the invention, it is possible to omit any mechanical locking or theft prevention systems, which leads to a reduction in weight and costs.

In order to have an emergency hammer immediately available for opening the emergency exit, in an embodiment of the invention, an emergency hammer is mounted in the opening in the inner cover.

In another preferred embodiment of the invention, the opening in the inner cover is closed by a cover element which can be opened easily if required. Such a cover element, arranged for example as a plastic injection molded part, can be attached easily to the inner cover by molded clip noses, or the like, and can also be released from the inner cover as quickly and easily in order to make the emergency hammer as well as the hatch cover accessible. The cover element may also be provided with imprints or decals which indicate by symbols or letterings how to proceed in emergencies.

Other features and embodiments of the invention are explained by reference to the enclosed drawings.

BRIEF DESCRIPTION OF THE DRAWINGS

FIG. 12 shows the roof hatch according to FIG. 11 in the compiled mounted position and FIGS. 13-1 to 5 show five steps which are to be carried out in an emergency for opening the emergency exit.

DESCRIPTION OF THE PREFERRED EMBODIMENTS

Figure 1:
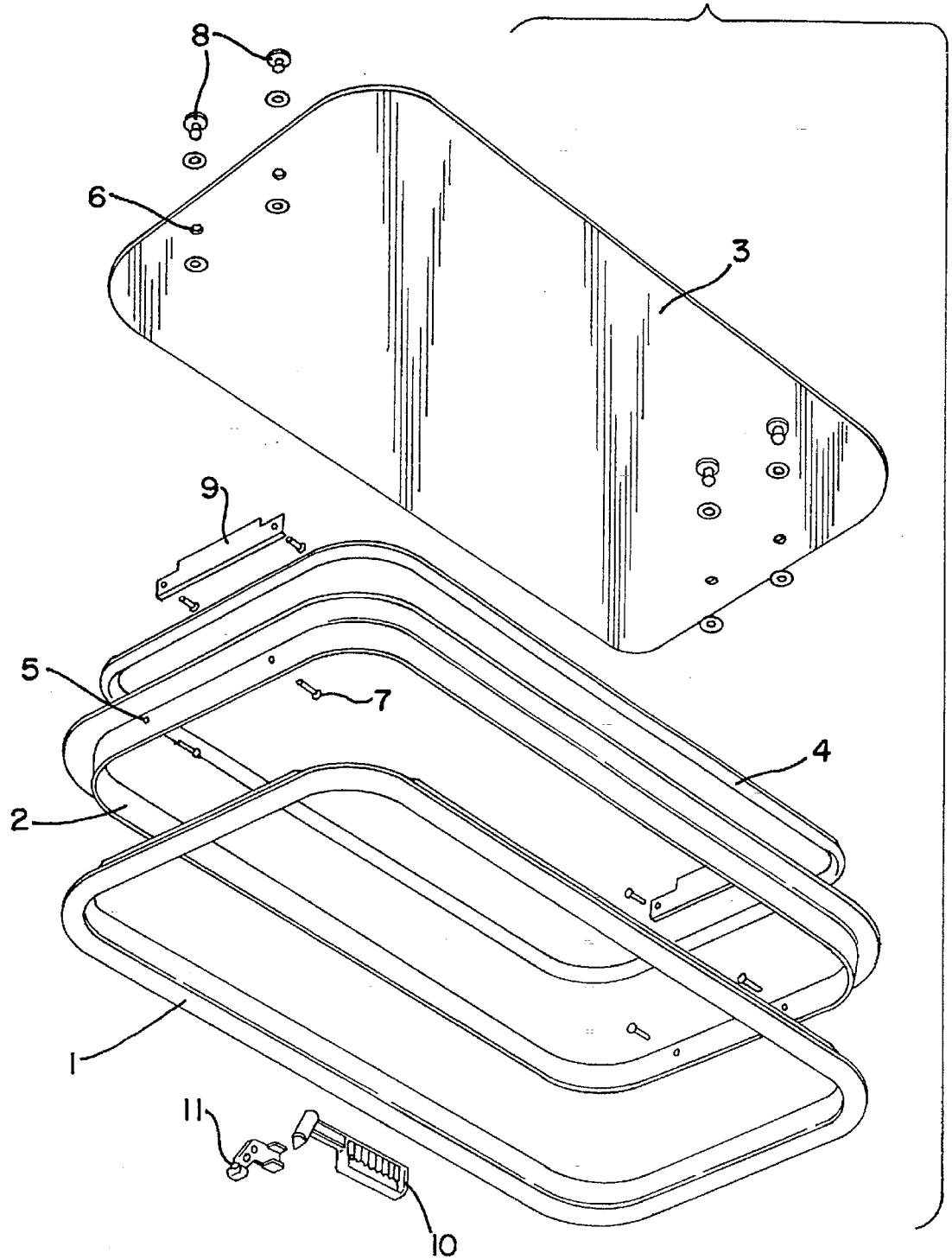
FIG. 1 shows a diagrammatic exploded view of a first embodiment of the roof hatch.

The main components of a roof hatch are an inner hatch frame 1, an outer hatch frame 2, a hatch cover 3 and a sealing frame 4 between the outer hatch frame 2 and the hatch cover 3. The inner hatch frame 1 may be made of plastic and the outer hatch frame 2 may be of aluminum. The sealing frame 4 can be a hollow chamber profile made of rubber or plastic and the hatch cover 3 may be a glass plate preferably shatterable.

In all embodiments of the roof hatch, screw holes 5 and 6 for fastening screws 7 and 8 are located at the same position in the outer hatch frame 2 and in the hatch cover 3. Plain washers and sealing washers are provided for the fastening screws 8.

Figure 7:
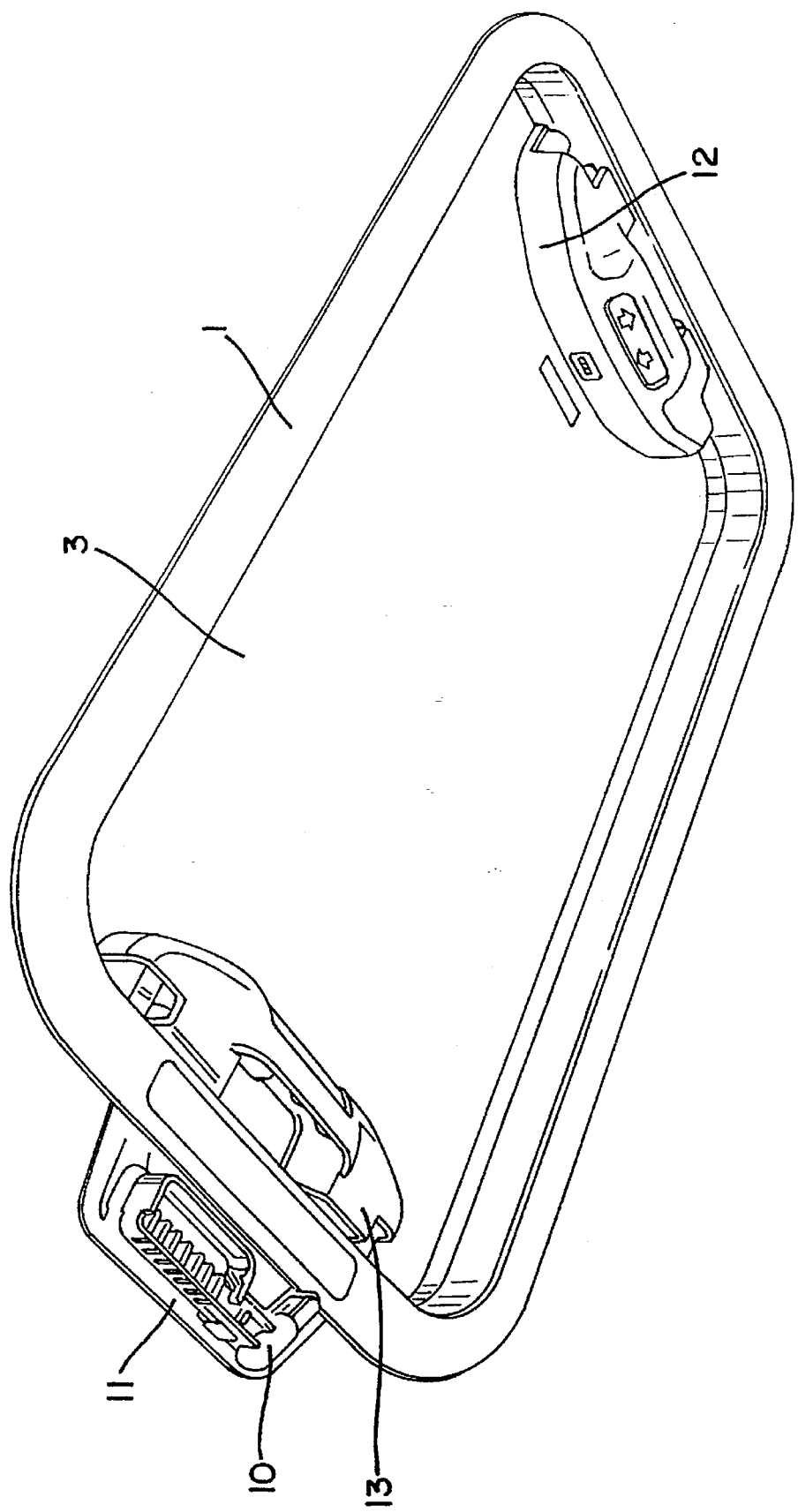
FIG. 7 shows a diagrammatic view of the roof hatch with an emergency hammer and a mounting means for the hammer.

FIG. 1 shows that the hatch cover 3 is connected with the outer hatch frame 2 by two adapter angles 9 located at opposite ends of the hatch cover. The hatch cover 3 can therefore not be opened. However, it can be destroyed or broken open in an emergency by an emergency hammer 10 which is placed in a mounting means 11 at the outer frame 2 (also see FIG. 7). In the event of an accident, the roof hatch can thus be used as an escape route.

FIG. 2 again shows the basic elements comprised of inner hatch frame 1, outer hatch frame 2, hatch cover 3, sealing frame 4 and fastening screws 7 and 8. Instead of using the adapter angles 9, the hatch cover 3 is connected to the outer hatch frame 2 via manually actuatable adjusters 12 located at opposite ends of the hatch cover. The adjusters 12 each comprise an adjuster casing 13, two levers 14 at the opposite ends of the casing and two springs 15 loading the levers 14. The hatch cover 3 can be raised manually into a ventilating position by rotating the levers 14. The cover can be destroyed by the emergency hammer 10 for creating an escape route.

FIG. 3 again shows the basic elements of inner hatch frame 1, outer hatch frame 2, hatch cover 3, sealing frame 4 and fastening screws 7 and 8. In the roof hatch in accordance with FIG. 3 there are also adjusters 12 but these are electromotively actuatable by an electromotor 16. The hatch cover 3 can be destroyed by the emergency hammer 10 for creating an escape route.

Figure 4:
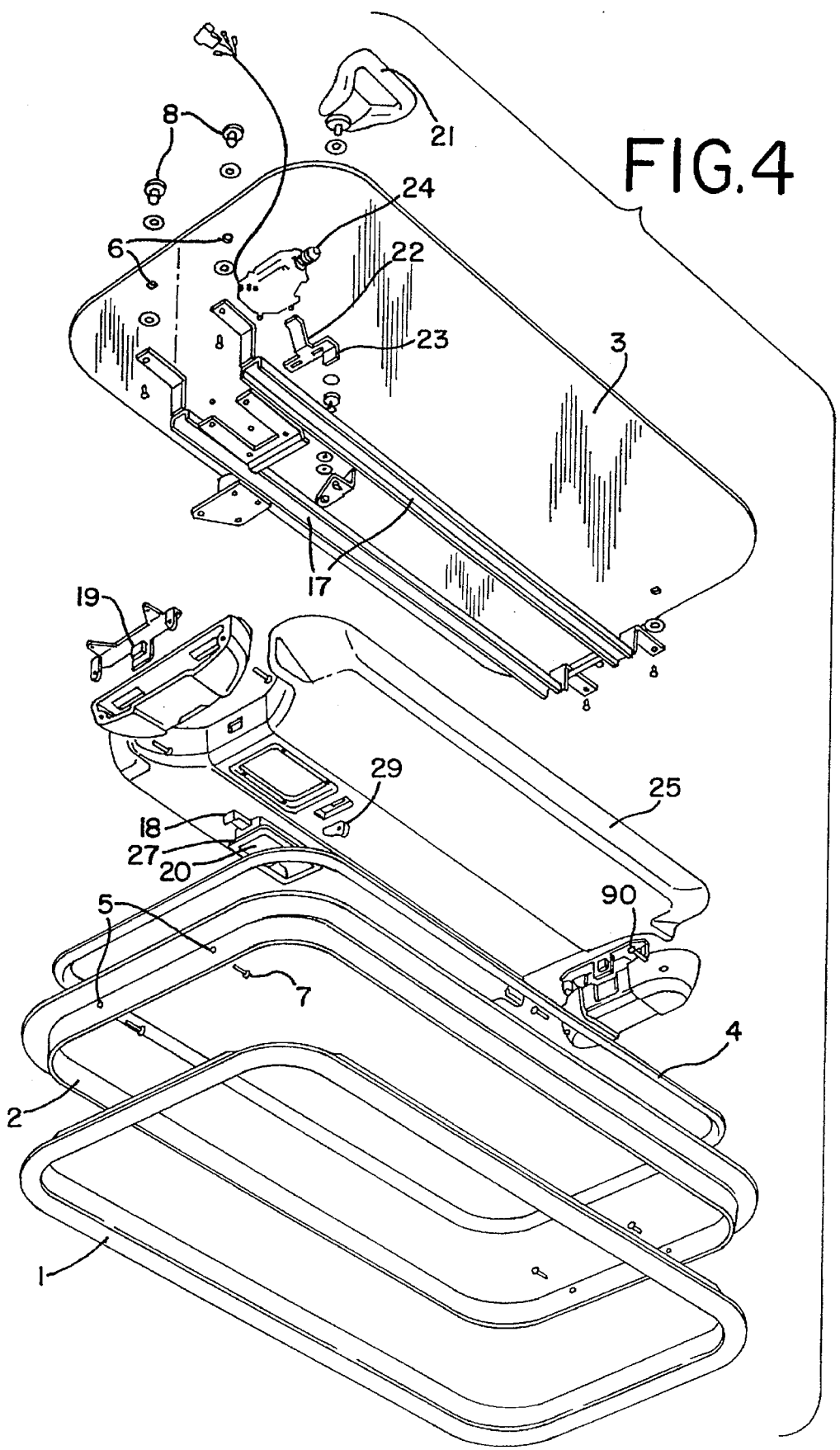
FIG. 4 shows a diagrammatic exploded view of a fourth embodiment of the roof hatch.

In FIG. 4, in addition to the basic elements of inner hatch frame 1, outer hatch frame 2, hatch cover 3, sealing frame 4 and fastening screws 7 and 8, FIG. 4 shows longitudinal beams 17 attached to hatch cover 3. The attachment of the hatch cover 3 to the outer hatch frame 2 is made by adapter angles 90, so that, and similar to the embodiment of FIG. 1, there is a rigid non-openable connection between hatch cover 3 and outer hatch frame 2. In an emergency the hatch cover 3 may be ejected from the outer hatch frame 2. For this purpose an unlocking mechanism 27 is provided which comprises a safety catch 18 which engages in the locking recess 19 formed by the adapter angle 90. The safety catch 18 can be opened in an emergency, namely through the actuating handle 20 arranged in the interior of the vehicle and an actuating handle 21 arranged on the outside of the vehicle. A blocking device 22 provides a theft protecting means which blocks the actuating handle 21. The blocking device 22 may be provided with a locking nose 23 which is manually movable into its respective positions by means of hand lever 29 or is automatically movable by means of an electric actuator 24. The actuator 24 is preferably coupled with the central locking system of the vehicle to operate the blocking device when the vehicle is locked. The aforementioned components are attached to longitudinal beams 17, which in addition hold a cover plate 25 as a decorative element.

Figure 2:
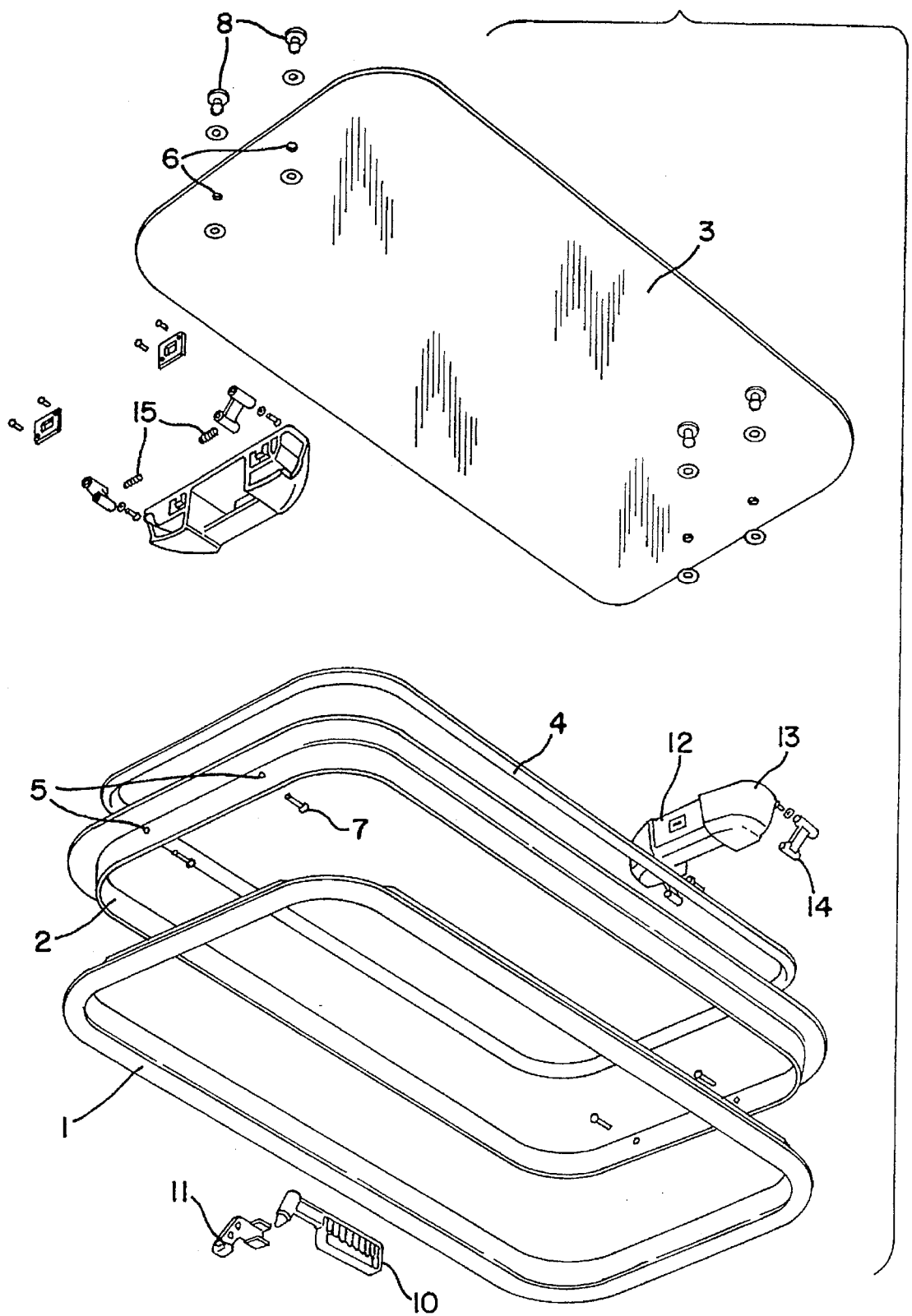
FIG. 2 shows a diagrammatic exploded view of a second embodiment of the roof hatch.
Figure 5:
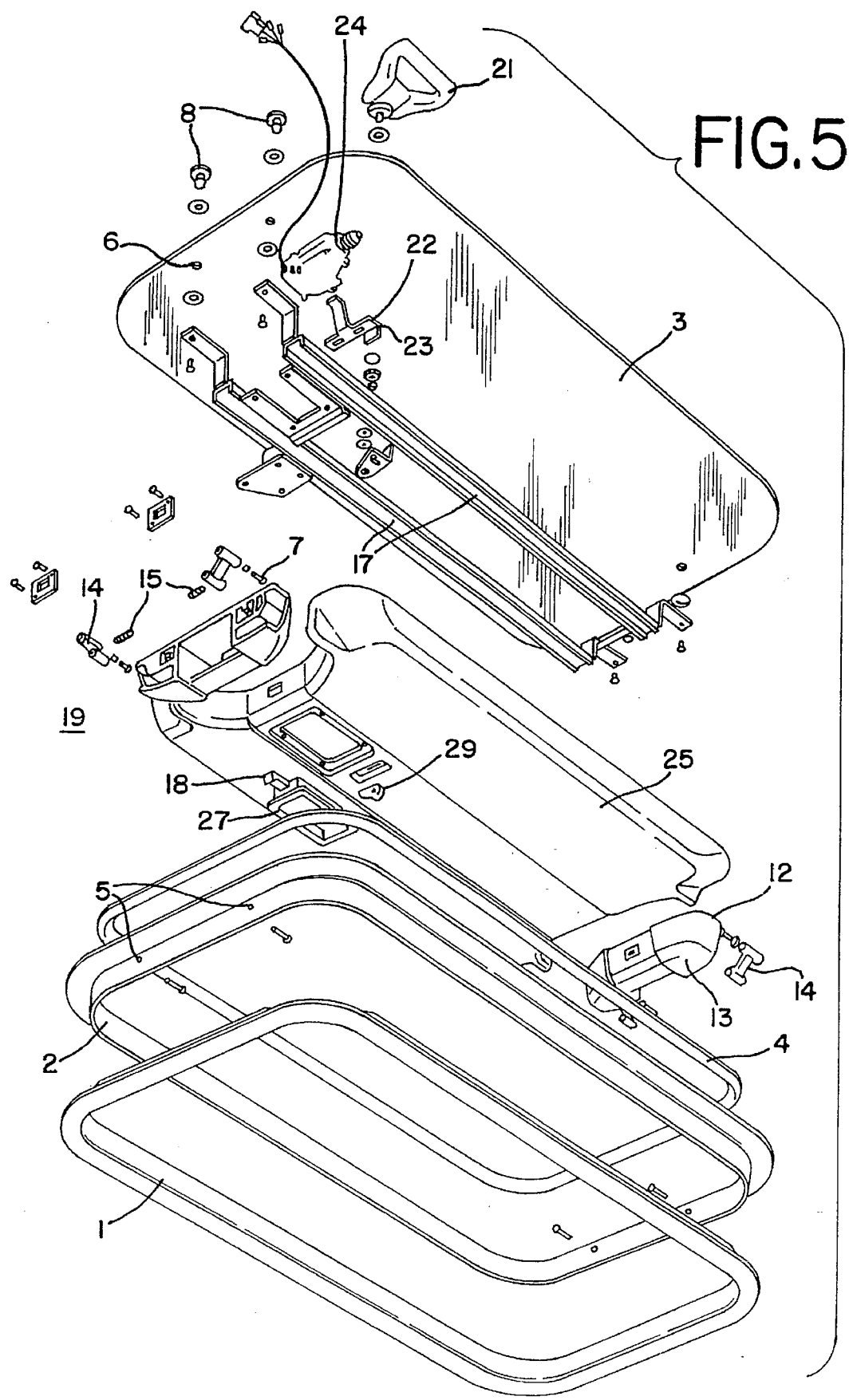
FIG. 5 shows a diagrammatic exploded view of a fifth embodiment of the roof hatch.

FIG. 5 is provided with the same basic structure as is described by reference to FIG. 4, so that the same reference numerals are used. The only difference is that adjusters 12, as were described in reference to FIG. 2, are provided.

Figure 3:
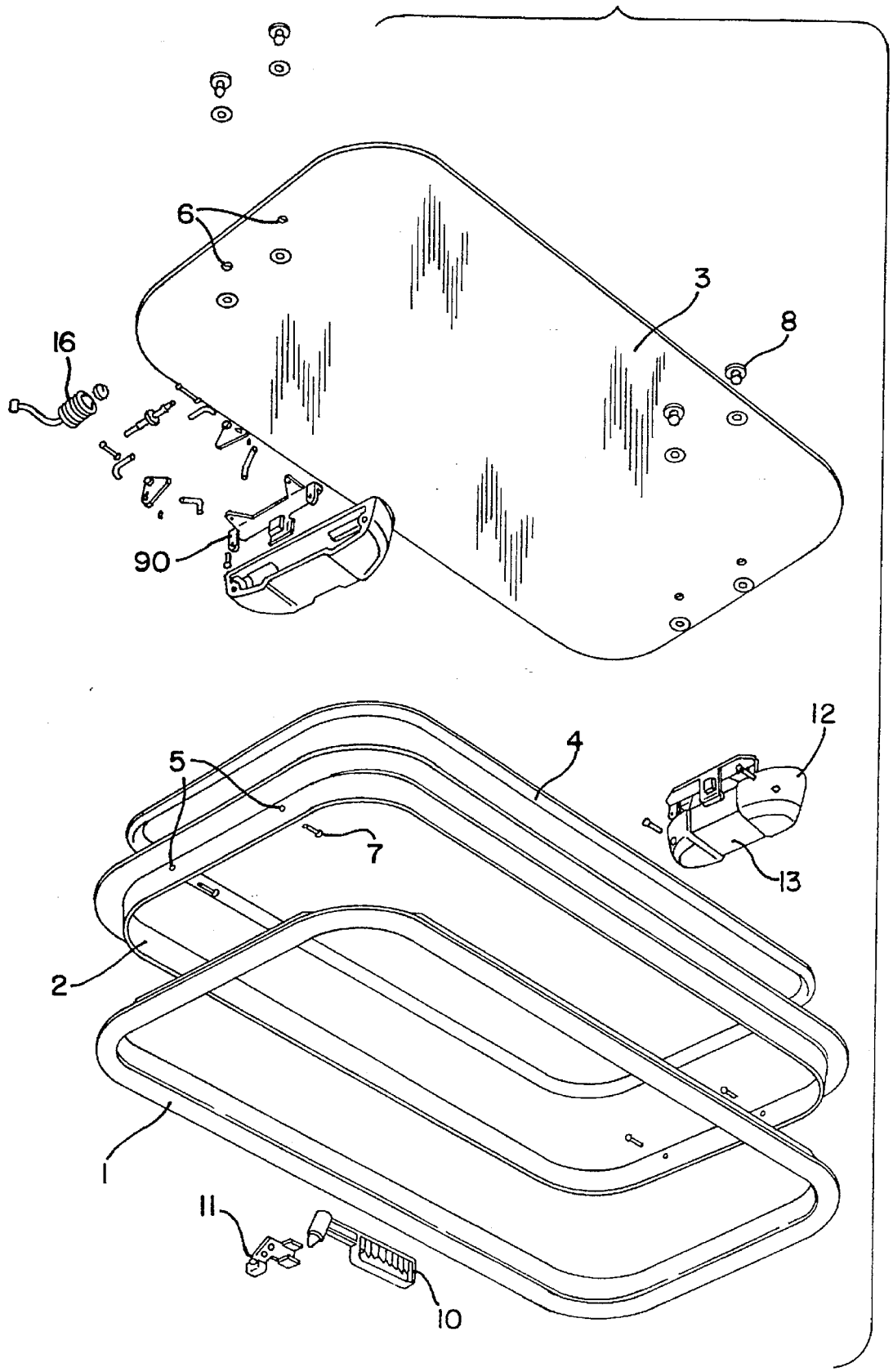
FIG. 3 shows a diagrammatic exploded view of a third embodiment of the roof hatch.
Figure 6:
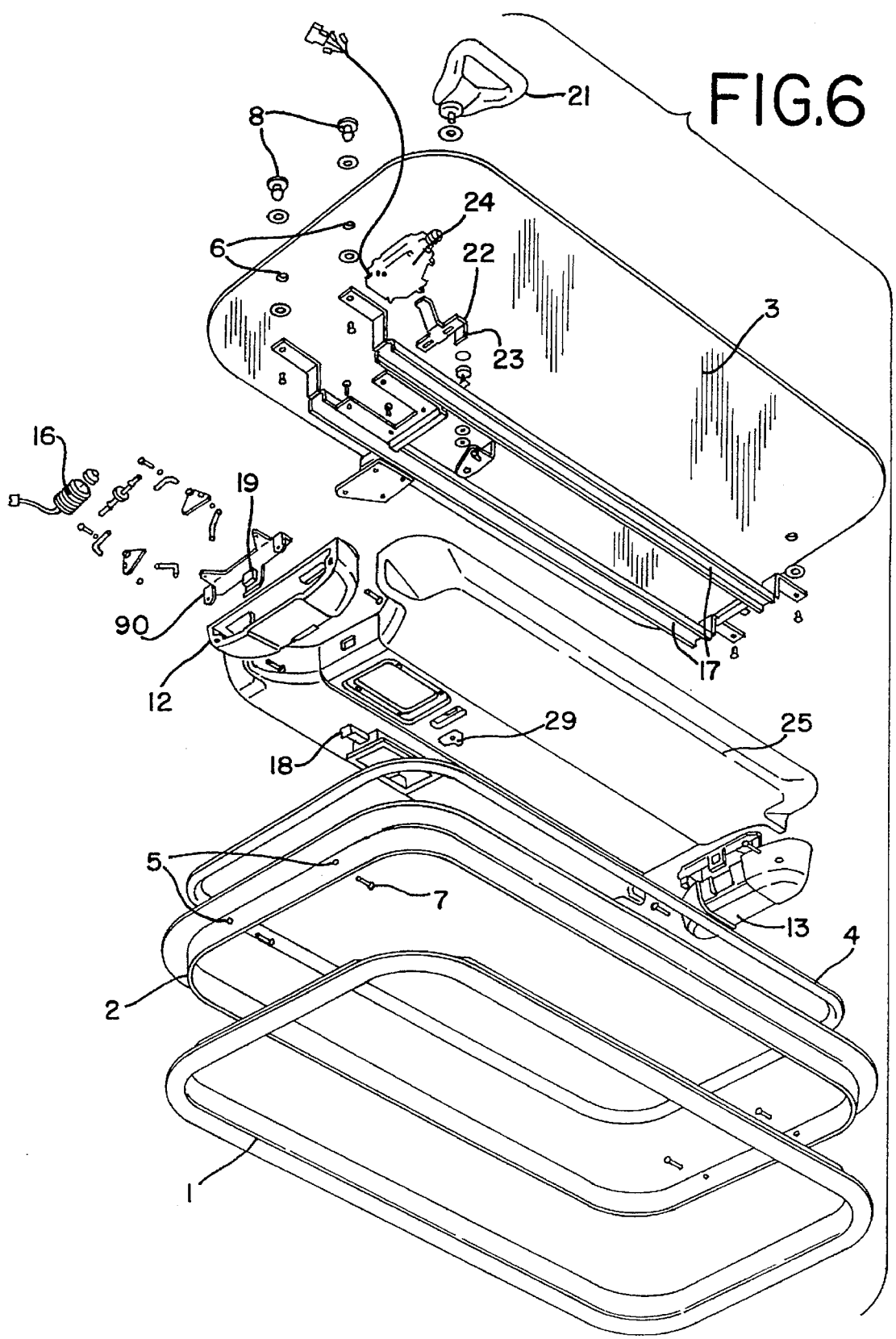
FIG. 6 shows a diagrammatic exploded view of a sixth embodiment of the roof hatch.

FIG. 6 shows the structure of FIG. 4 wherein the adjuster 12 is electromotively actuatable as described in reference to the example of FIG. 3.

Figure 8:
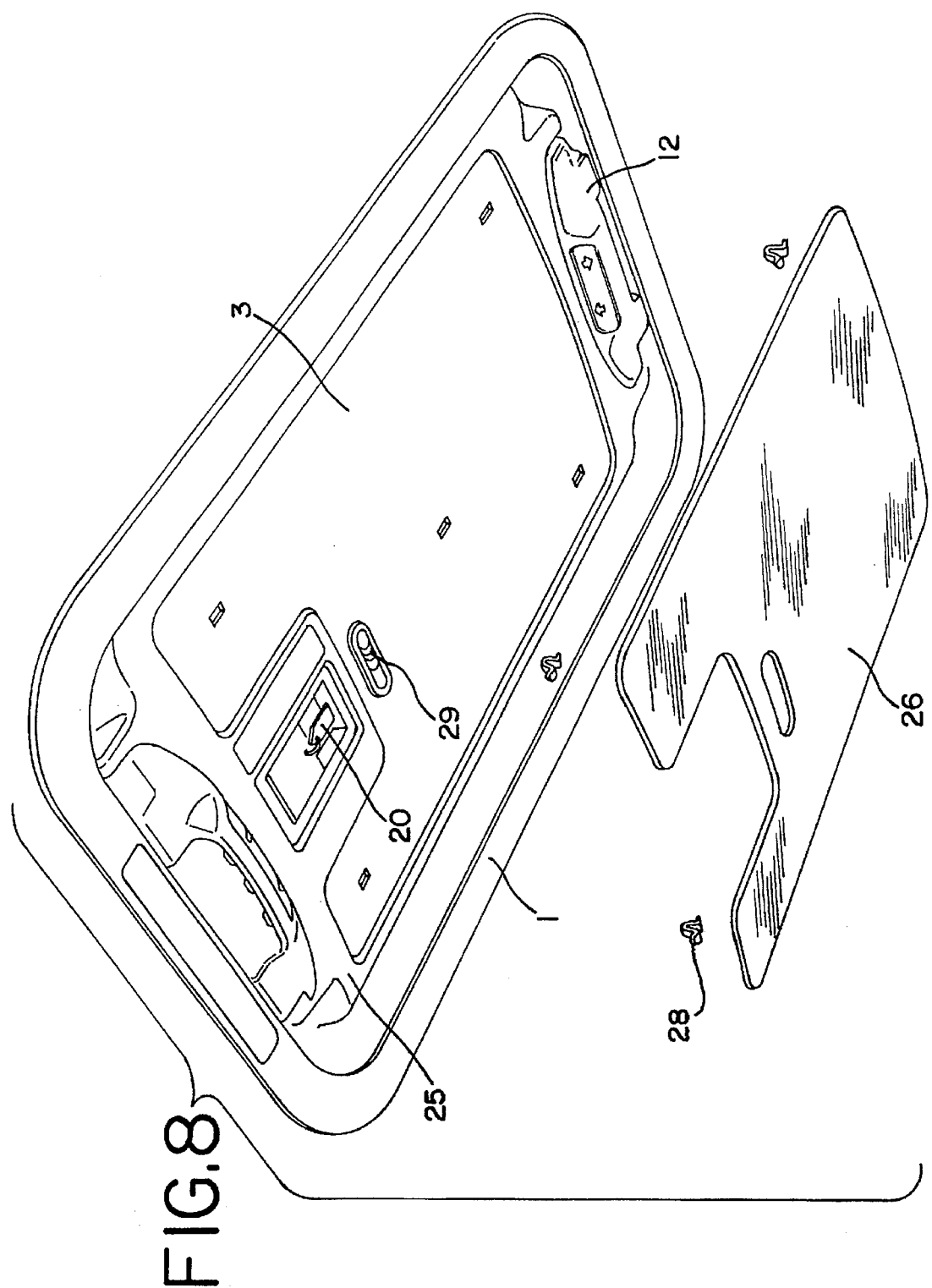
FIG. 8 shows a diagrammatic exploded view of the roof hatch with decorative element.

FIG. 8 shows a cover plate 25 that can be lined with a decorative element 26. For this purpose, resilient fastening elements 28 may be provided. FIG. 8 also shows the actuating handle 20 of the unlocking mechanism 27 and a hand lever 29 of the blocking device 22 as well as the adjusters 12.

Figure 9:
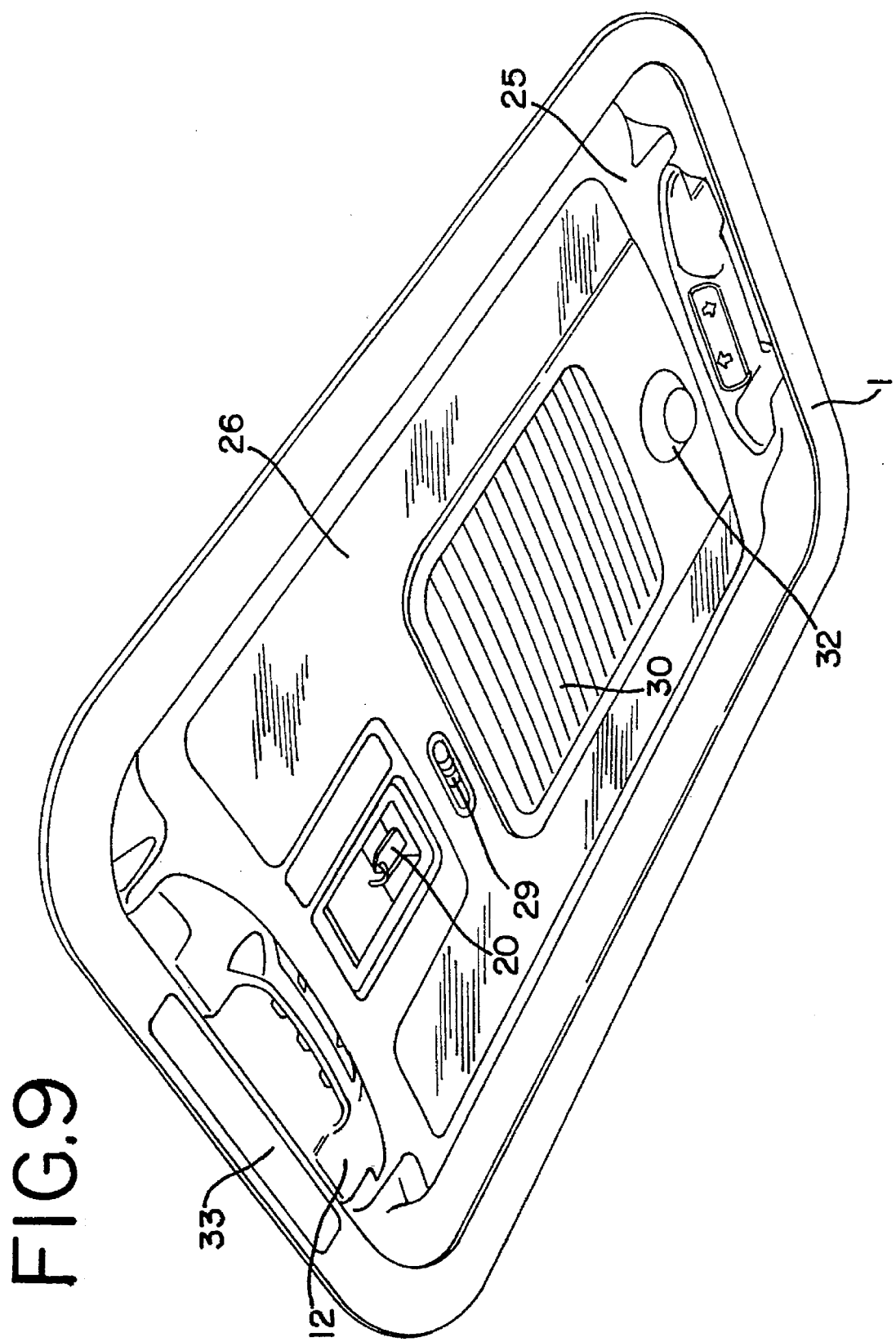
FIG. 9 shows a diagrammatic inner view of the roof hatch.
Figure 10:
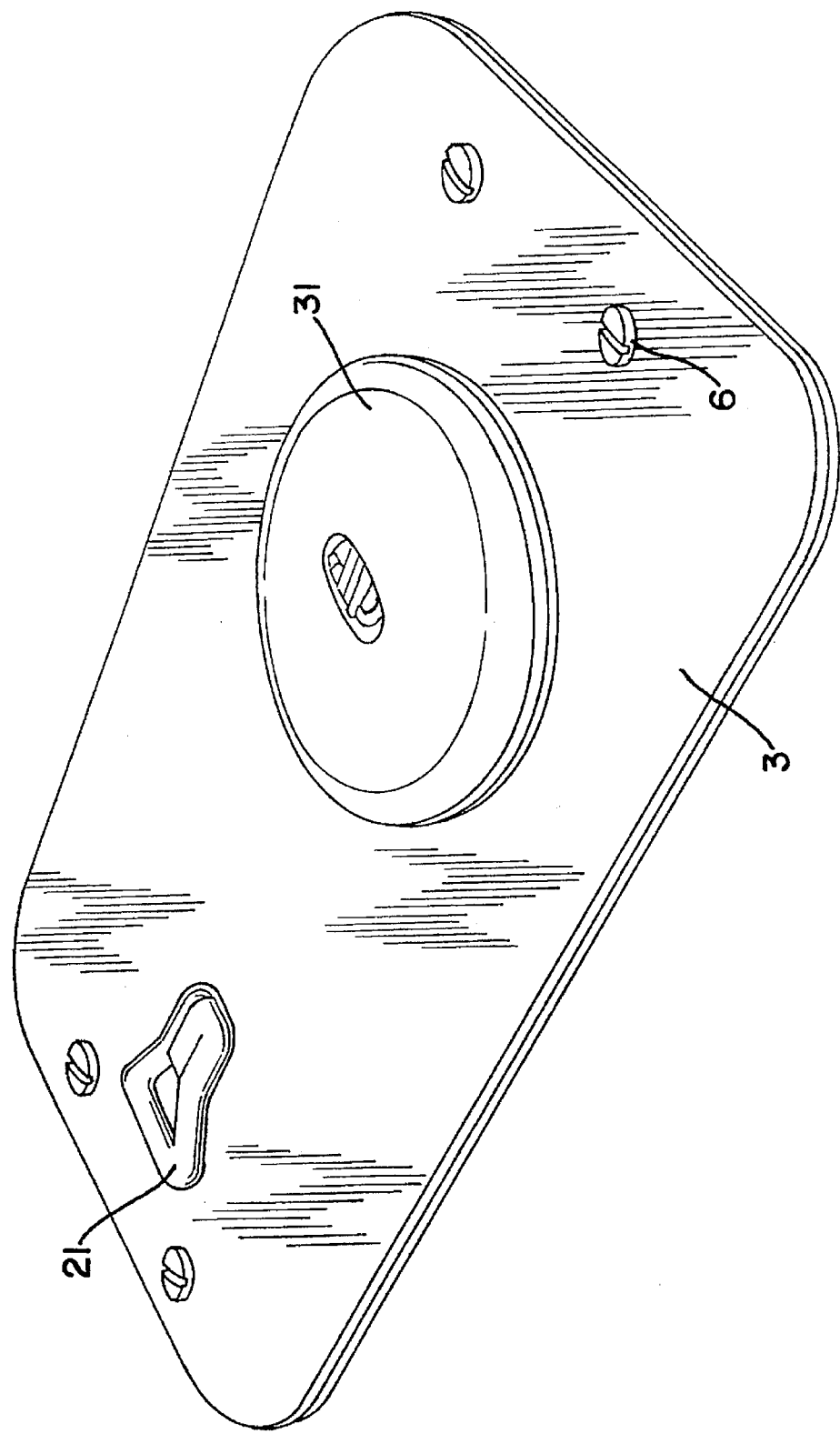
FIG. 10 shows a diagrammatic outer view of the roof hatch.

FIG. 9 additionally shows a ventilating grid 30 of an electromotively driven (turbo) ventilator 31 which is shown in FIG. 10. An emergency lighting or escape route marking is provided with reference numeral 32. It is optionally also possible to provide the inner frame 1 with backlit lettering 33 with the word EXIT for example.

Figure 11:
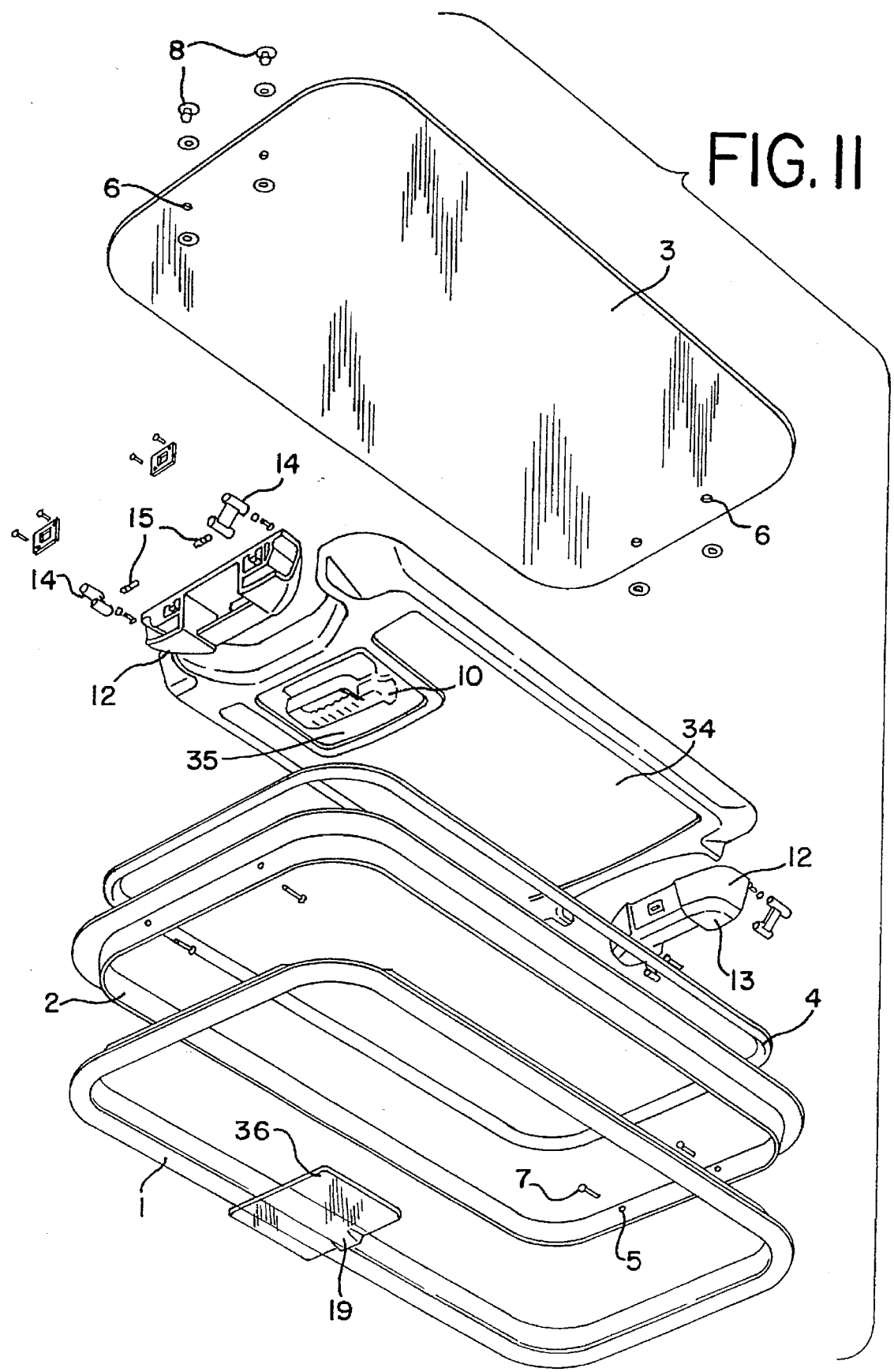
FIG. 11 shows a diagrammatic exploded view of a seventh embodiment of the roof hatch.
Figure 12:
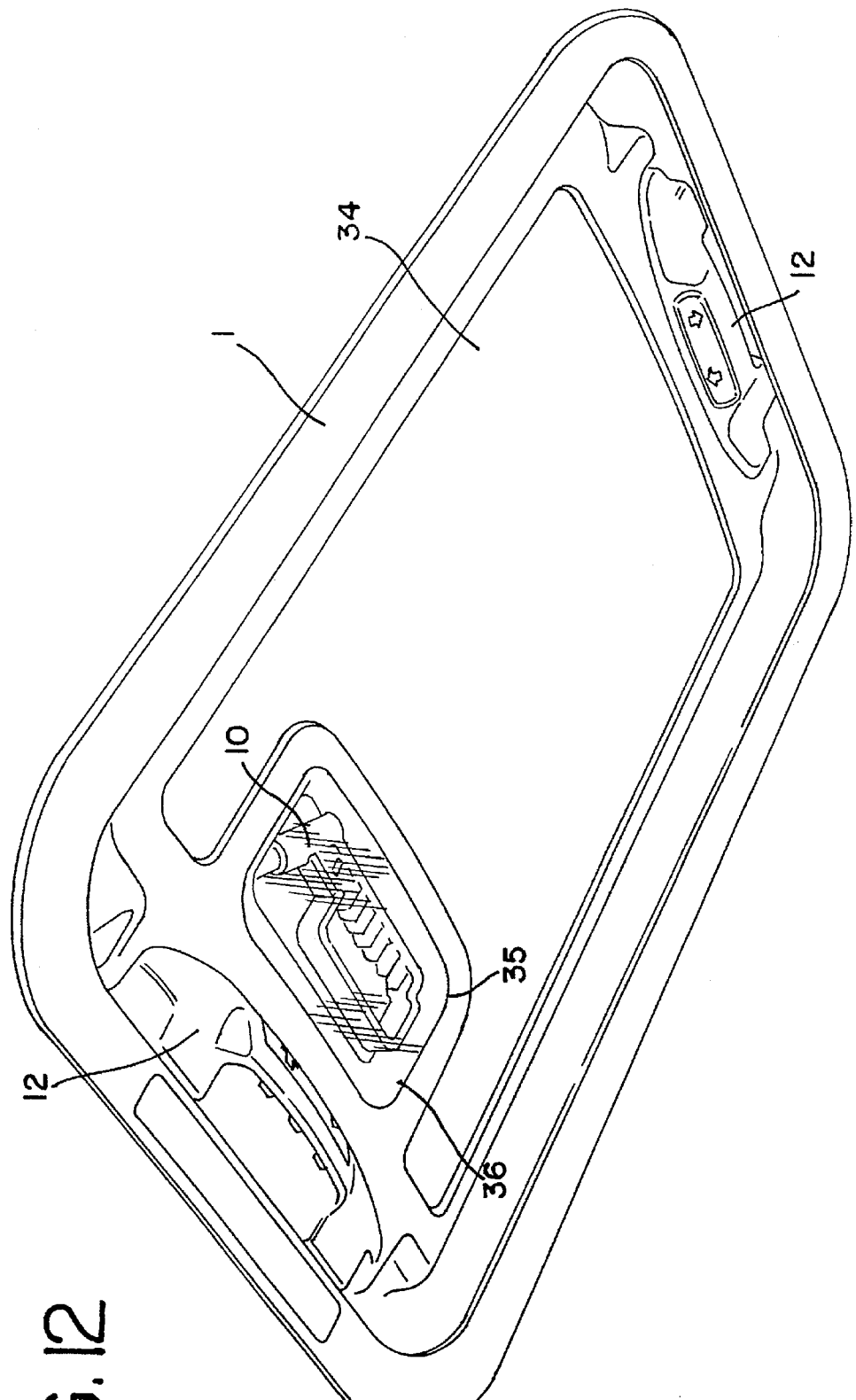

The main construction elements of the roof hatch according to FIGS. 11 and 12 are an inner hatch frame 1, an outer hatch frame 2, a hatch cover 3 formed by a safety glass pane and a sealing frame 4 between the outer hatch frame 2 and the hatch cover 3.

The hatch cover 3 is connected with the outer hatch frame 2 via manually actuatable adjusters 12. The adjusters 12 each comprise an adjuster casing 13, two levers 14 and two springs 15 loading the levers 14.

An inner cover 34 is arranged below the hatch cover 3 and extends plane parallel thereto. The cover 34 is mounted by being clamped between the hatch cover 3 and the adjusters 12 which are attached. The inner cover 34, which may be arranged as a plastic or sheet metal molded part and may be provided on the visible side with a decorative lamination, comprises an opening 35 whose edges are arranged in such a way that an emergency hammer 10 can be mounted thereon and can easily be detached therefrom.

The opening 35 in the inner cover 34 is closed by a cover element 36 which also covers the emergency hammer 10. The cover element 36 is preferably a sheet metal or plastic molded part and is preferably connected via clips (not shown in detail) with the inner cover 34 and can thus be easily mounted and dismounted. The dismounting occurs by withdrawing the cover element 36 from the inner cover 34. This is facilitated by a handle recess 37 on the cover element 36. The handle recess 37 can naturally be replaced by an opening slot (not shown) arranged in the cover element 36. As is desired by the customer, the cover element 36 may be transparent or opaque and may carry imprints or decals.

The roof hatch can be used as an emergency exit in the event of any emergency. The steps required for this operation are shown in FIG. 13 in individual illustrations designated with numbers 13-1 to 5. Number 1 indicates by lettering or a transparent arrangement of the cover element 36 that an emergency hammer 10 is situated here. Number 2 shows the removal of the cover element 36 from the inner cover 34. Number 3 shows that the hatch cover 3 can be smashed with the emergency hammer 10 through the opening 35. Number 4 shows the result of the destruction. Number 5 finally shows the ejection of the inner cover 34 with the collected glass particles.

System features:
 Modular system
 Standard and convenient versions from one supplier
 Combinable and expandable at will from standard to convenient version
 Realization of customer-specific requirements in combination with optimal pricing
 Lightweight design
 Recycling:
 Design suitable for recycling (recyclable and separatable materials)
 Security and functionality by "ergonomic design"
 Hatch variations:
 Mere emergency exit
 Manual hatch
 Electrical hatch
 One-hand operation by anybody
 Theft protection:
 Manual design (standard)—Electric design (central locking system)
 Position recognition in the cockpit
 Electric control integrated in hatch
 Minimal installation work needed in the vehicle
 Design: Adaptation of geometry and color to dome lining
 Meets regulations for emergency hatches Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roof hatch for positioning in the roof of a vehicle, the hatch comprising:
 an inner hatch frame;
 an outer hatch frame opposite the inner frame, the inner and outer hatch frames defining the periphery of an open area;
 a hatch cover made of breakable glass over the open area defined by the inner and outer frames;
 a sealing frame between the outer hatch frame and the hatch cover;
 means for mounting the hatch cover on the outer hatch frame; and
 an inner cover arranged below the hatch cover, the inner cover having a window-like opening defined in the inner cover making the hatch cover accessible through the inner cover, thereby to have access to the hatch cover for breaking the hatch cover into pieces in an emergency, the inner cover substantially covering the surface of the hatch cover and being positioned and dish shaped so as to catch and hold broken pieces of the hatch cover.

2. The roof hatch of claim 1, wherein the inner and the outer frames are generally rectangular in shape with rounded corners and are shaped to define a generally rectangularly shaped open area with rounded corners, and the hatch cover is generally rectangular shaped with rounded corners to correspond to the shape of the open area.

3. The roof hatch of claim 1, wherein the inner hatch frame includes a mounting element, and an emergency hammer supported to the mounting element adapted for smashing or breaking the hatch cover.

4. The roof hatch of claim 1, wherein the hammer is mounted at the opening in the inner cover.

5. The roof hatch of claim 1, further comprising a inner cover element over the opening in the cover, the cover element being supported to the inner cover in a manner enabling the cover element to be easily opened.

* * * * *